(12) United States Patent
Eisenstadt et al.

(10) Patent No.: US 12,412,040 B2
(45) Date of Patent: Sep. 9, 2025

(54) INTERPRETING SUMMARIZATION MODEL DECISIONS BASED ON ATTENTION

(71) Applicant: Microsoft Technology Licensing, LLC, Redmond, WA (US)

(72) Inventors: Roy Eisenstadt, Tel Aviv (IL); Abed El Kader Asi, Sammamish, WA (US); Royi Ronen, Tel Aviv (IL); Dean Geckt, Haifa (IL); Alexander Tsvetkov, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 299 days.

(21) Appl. No.: 18/320,851

(22) Filed: May 19, 2023

(65) Prior Publication Data
US 2024/0386209 A1 Nov. 21, 2024

(51) Int. Cl.
*G06F 16/34* (2025.01)
*G06F 40/284* (2020.01)
*G06F 40/30* (2020.01)

(52) U.S. Cl.
CPC ............ *G06F 40/30* (2020.01); *G06F 16/345* (2019.01); *G06F 40/284* (2020.01)

(58) Field of Classification Search
None
See application file for complete search history.

(56) References Cited

U.S. PATENT DOCUMENTS

| | | |
|---|---|---|
| 2007/0124263 A1 | 5/2007 | Katariya |
| 2009/0300014 A1 | 12/2009 | Chakrabarti et al. |
| 2014/0136188 A1 | 5/2014 | Wroczynski et al. |
| 2018/0300400 A1* | 10/2018 | Paulus .................... G06N 3/044 |
| 2021/0366501 A1* | 11/2021 | Lee .......................... G06N 3/045 |
| 2021/0375289 A1 | 12/2021 | Zhu et al. |
| 2022/0092453 A1 | 3/2022 | Herger et al. |

(Continued)

OTHER PUBLICATIONS

"How to Create Meetings Summaries with OpenAI GPT-3", Retrieved from: https://tactiq.io/learn/how-to-create-meetings-summaries-with-openai-gpt-3#:~:text=Open%20ChatGPT%20and%20type%20%E2%80%9CSummarize,as%20the%20AI%20summarize%20everything, Feb. 8, 2023, 7 Pages.

(Continued)

*Primary Examiner* — Nafiz E Hoque
(74) *Attorney, Agent, or Firm* — Foley IP Law, PLLC

(57) ABSTRACT

The disclosure herein describes interpreting attention-based decisions of summarization outputs generated by a deep learning model. A decision interpretation model obtains attention values defining connections between input tokens associated with a source text and output tokens for a selected portion of a summary associated with the source text. The input tokens having the highest attention values indicating the strongest connections between the input tokens of the source text and an output token of the summary are selected as primary tokens. A semantic similarity between the primary tokens for each attention head and an output token is calculated. The model selects the primary tokens having the closest semantic similarity with the summary portion. A visual cue is generated on or within a portion of the source text corresponding to the primary tokens. The visual cue identifies dominant words in the source text used to explain the summary portion.

20 Claims, 8 Drawing Sheets

(56) References Cited

U.S. PATENT DOCUMENTS

| | | | |
|---|---|---|---|
| 2023/0107640 A1* | 4/2023 | Pang | G06F 40/166 |
| | | | 715/254 |
| 2024/0143927 A1* | 5/2024 | Yoon | G06N 3/08 |
| 2024/0193973 A1* | 6/2024 | Song | G06V 30/18152 |

OTHER PUBLICATIONS

Malik, Aisha, "Otter.ai rolls out a new AI-generated meeting summary feature and more collaboration tools", Retrieved from: https://techcrunch.com/2022/03/29/otter-ai-meeting-summary-feature/, Mar. 29, 2022, 15 Pages.

Muhammad, et al., "A Video Summarization Framework based on Activity Attention Modeling using Deep Features for Smart Campus Surveillance System", In Journal of PeerJ Computer Science, Mar. 25, 2022, pp. 1-21.

Gambhir, et al., "Recent automatic text summarization techniques: a survey", Artificial Intelligence Review, vol. 47, Mar. 29, 2016, pp. 1-66.

International Search Report and Written Opinion received for PCT Application No. PCT/US2024/028454, Sep. 19, 2024, 12 pages.

* cited by examiner

FIG. 7

INTERPRETING SUMMARIZATION MODEL DECISIONS BASED ON ATTENTION

BACKGROUND

Summarization models, such as transformer models, can be used to automatically generate a summary of an input transcript or other source text without human intervention. However, it can be difficult for a user to understand how the summarization model decided which portions of the source text to summarize and which portions to disregard or minimize in the summary making it difficult for users to interpret the summary outputs of the summarization models. This can lead to a lack of user confidence and trust in the model outputs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for interpreting attention-based decisions of summarization outputs generated by a deep learning model is described. A plurality of attention values defining connections between input tokens associated with a source text and output tokens associated with a selected portion of a summary of the source text from a summarization model is obtained. A set of primary tokens are created for each attention head in a plurality of attention heads associated with the summarization model. The set of primary tokens are selected from a plurality of input tokens associated with each attention head based on the attention values. A semantic similarity between the selected set of primary tokens for each attention head with a plurality of output tokens associated with the selected portion of the summary is calculated. The set of primary tokens for an attention head having greatest semantic similarity with the selected portion of the summary is selected. A visual cue highlighting a plurality of words within a portion of the source text corresponding to the selected set of primary tokens for the attention head having greatest semantic similarity with the selected portion of the summary is generated within a user interface.

Corresponding reference characters indicate corresponding parts throughout the drawings. In FIGS. 1 to 8, the systems are illustrated as schematic drawings. The drawings may not be to scale.

BRIEF DESCRIPTION OF THE DRAWINGS

FIG. 7 is an exemplary screenshot illustrating generation of a visual cue identifying primary words in source text corresponding to a selected portion of a source text summary.

Corresponding reference characters indicate corresponding parts throughout the drawings.

DETAILED DESCRIPTION

Figure 1:
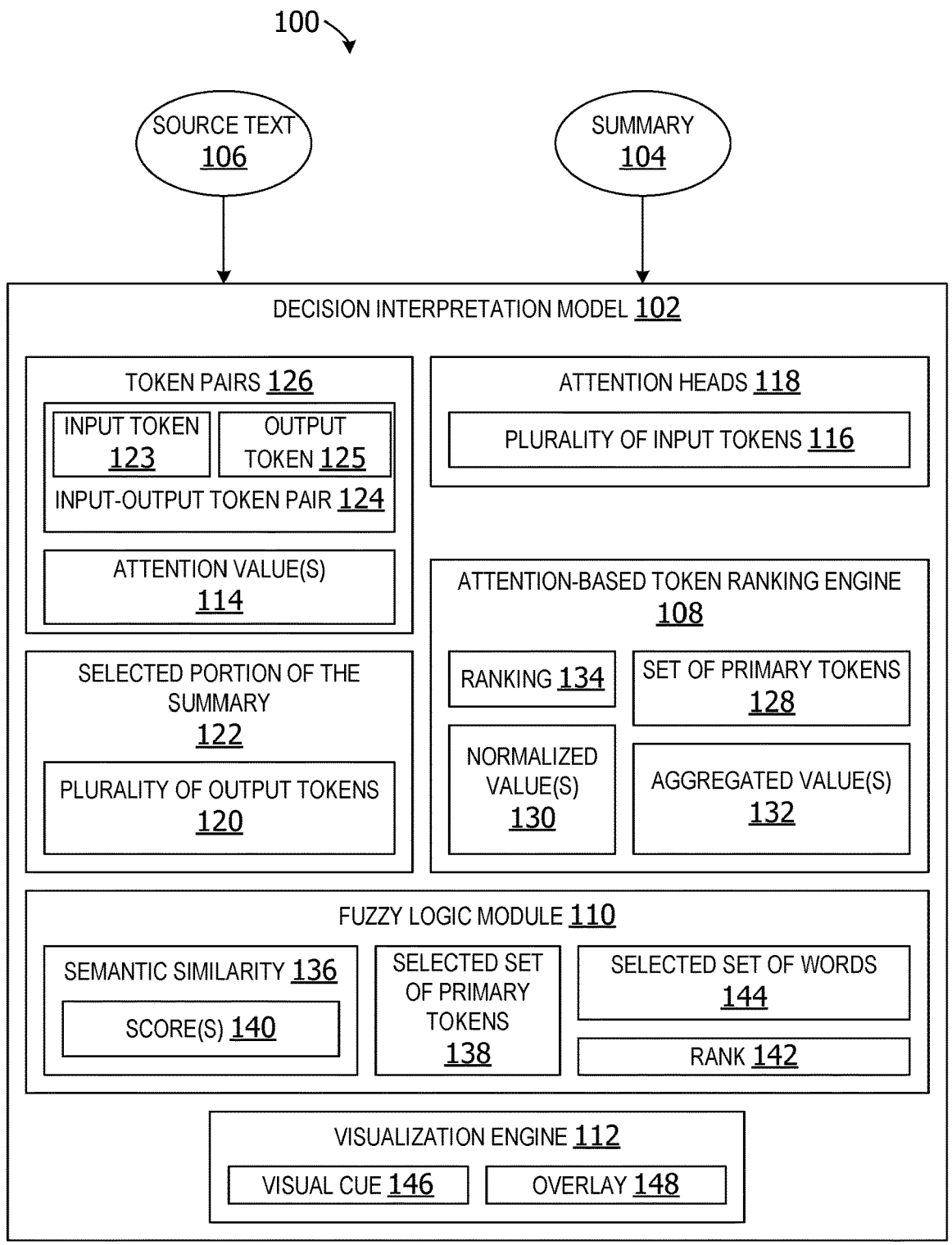
FIG. 1 is an exemplary block diagram illustrating a system for attention-based decision interpretation of summaries generated by summarization models according to an embodiment.

Aspects of the disclosure provide a computerized method and system for attention-based decision interpretation of summarization model outputs. In some examples, a decision interpretation model obtains attention values generated by attention layers of a summarization model for use in interpreting the summary outputs of the summarization model. The obtained attention values define connections between input tokens associated with a source text and output tokens associated with a selected portion of a summary of the source text from a summarization model. The source text is any type of source input, such as a transcript of a conversation or other communications exchange between multiple participants. The attention values are generated by two or more attention heads of the summarization model. The attention heads may also be referred to as attention layers of the summarization model. The decision interpretation model selects a set of primary tokens from a plurality of input tokens associated with each attention head in a plurality of attention heads within the summarization model based on the attention values. The decision interpretation model selects the input tokens having the highest attention values. The higher attention values indicate the input tokens have stronger connections or relations with one or more output tokens of the selected portion of the summary than input tokens with lower attention values. Each token represents a word or portion of a word. In this manner, the system creates a list of important tokens for each attention head. This enables the system to identify which tokens were more important or more likely to have been significant with regard to creation of the summary or a portion of the summary.

Other aspects of the disclosure provide a fuzzy matching model or fuzzy matching module associated with the decision interpretation model. The fuzzy matching model calculates a semantic similarity between the selected set of primary tokens for each attention head with a plurality of output tokens associated with the selected portion of the summary. In other words, the fuzzy matching model generates vectors for the attention heads and a portion of the summary which indicates a level of semantic similarity between the portion of the summary and the list of primary tokens for each attention head. This enables the system to identify which attention head and corresponding set of tokens are most likely contributed to or otherwise influenced the content of the summary portion. The decision interpretation model selects the set of primary tokens for the attention head having greatest (closest) semantic similarity with the selected portion of the summary. The system can alternatively use a semantic similarity score or ranking based on the vectors for each attention head to determine which attention head is most similar semantically to the summary portion. Each of the tokens in the selected set of primary tokens corresponds to a word, words, or portion of a word in the original source text which is most likely to assist the user in interpreting the summary portion selected by the user for decision interpretation.

In yet other aspects, the decision interpretation model generates a visual cue which highlights or otherwise emphasizes the word, words, or portion of a word within the portion of the original source text that corresponds to the summary statements in the selected portion of the summary generated by the summarization model. The visual cue is displayed as an overlay on the original source text via a user interface or other display device. This enables improved user interaction with the system via the user interface while reducing user time spent searching for potentially relevant portions of the source text corresponding to a summary portion.

The disclosure operates in an unconventional manner by analyzing attention values associated with attention heads of a summarization model to identify words or sentences in original source text which were likely given greater weight or emphasis by the summarization model when creating summary of the original source text. This assists the user in understanding the summarization model outputs thereby improving user trust in the summarization model results as well as providing insights into decision making by the summarization model.

Further, the disclosure enables the generation of customized, focused decision interpretation insights associated with summarization models, enabling increased user confidence in automated summaries generated by these summarization models. The use of the visual cues enable the user to quickly and efficiently identify relevant portions of the source text used to generate selected portions of an automated summarization generated by various summarization models without requiring the user to read or review significant portions of the source text. In other words, highlighting or otherwise annotating the primary words in the source text associated with a portion of a summary enables the user to immediately view the words, phrases or sentences that are directly related to the selected portion of the summary without having to read or review an entire paragraph or section of the source text via the user interface, thereby reducing manual effort and improving reliability and user trust in automated summarization outputs of the summarization models.

FIG. 1 is an exemplary block diagram illustrating a system 100 configured for attention-based decision interpretation of summaries generated by summarization models according to an embodiment. The system 100 includes a decision interpretation model 102 configured to interpret the output summary 104 generated by a summarization model, such as, but not limited to, the summarization model 210 in FIG. 2 below.

In some examples, the system 100 is located, stored and/or executed on a computing device, such as a personal computer, server device, tablet computing device, or the like. For instance, a server device may be configured to execute the operations of the decision interpretation model 102.

Alternatively, in other examples, the system 100 is distributed across multiple computing devices, such that components, elements, and/or parts of the system 100 may be located and/or executed on different computing devices that are in communication with each other (e.g., via one or more communication networks, such as internal networks, the Internet, or the like). For instance, the system 100 may be configured to store data associated with operations of the decision interpretation model 102 on one or more distributes storage devices and/or the system 100 may be configured to execute the decision interpretation model 102 on one or more distributed computing devices (e.g., the attention-based token ranking engine 108 is executed on a first server device and the fuzzy logic module 110 is executed on a second server device). In other examples, other arrangements of computing devices may be used to implement the system 100 without departing from the description.

The summary 104 is a summary of a source text 106 input into the summarization model. In some examples, the summary 104 includes one or more highlight statements associated with one or more portions of the source text 106. The source text 106 is any type of text document associated with a communications exchange between one or more participants, such as, but not limited to, a transcript of a conversation or other communications generated by one or more participants. The source text 106 may include a transcript of a spoken conversation or a text-based conversation, such as a communications exchange involving text messages, direct messages, email messages or any other type of text-based message exchange. The source text may also include a transcript of communications including both spoken messages as well as text-based messages, such as where one or more participants are speaking and one or more participants are sending text-based messages.

In some examples, the source text 106 includes a transcript having natural language text data of a language used during a communication, such as a telephone call, video call, instant messaging chat log, and/or other forms of conversation between two parties. In related examples, the source text 106 can also include single-party communications, such as voice mail, email or other transcripts of a monologue, as described herein, without departing from the description. The source text 106 is automatically generated using speech-to-text or voice-to-text analyses of an audio stream or other record of the communication. Additionally, or alternatively, the source text 106 may include data indicating words and phrases used during the communication and/or other data associated with the communication, such as punctuation used, timing data associated the communication (e.g., when words are said, length of pauses between sentences, or the like).

The decision interpretation model 102 includes hardware, firmware, and/or software configured to identify primary words and/or sentences in the source text 106 corresponding to a selected portion of the summary 104 and output a visual cue identifying the primary words and/or sentences in a portion of the source text 106.

The decision interpretation model 102 includes an attention-based token ranking engine 108 configured to identify a set or list of primary tokens for each attention head of the summarization model that created the summary 104, a fuzzy logic module 110 configured to select the best set of primary tokens for the attention head which has the greatest semantic similarity with the output summary 104 or a selected portion of the output summary, and a visualization engine 112 configured to generate visual cues within the source text 106 and/or overlaid over a portion of the source text highlighting the words, phrases or sentences corresponding to the selected primary tokens having the greatest semantic similarity to the portion of the summary 104 as described herein.

In some examples, an attention head or attention layer is a component within a summarization model (i.e., generative conversational model) that produces attention values corresponding to relations between input and output tokens.

Specifically, the attention head computes an attention value for each input-output token pair. The attention value is a numerical value indicating the degree of relation or connection between a given input token and a given output token. In some examples, the closer the connection between an input token and an output token, the higher the attention value. Likewise, low attention values indicate relatively weak connection between an input token and output token.

Figure 2:
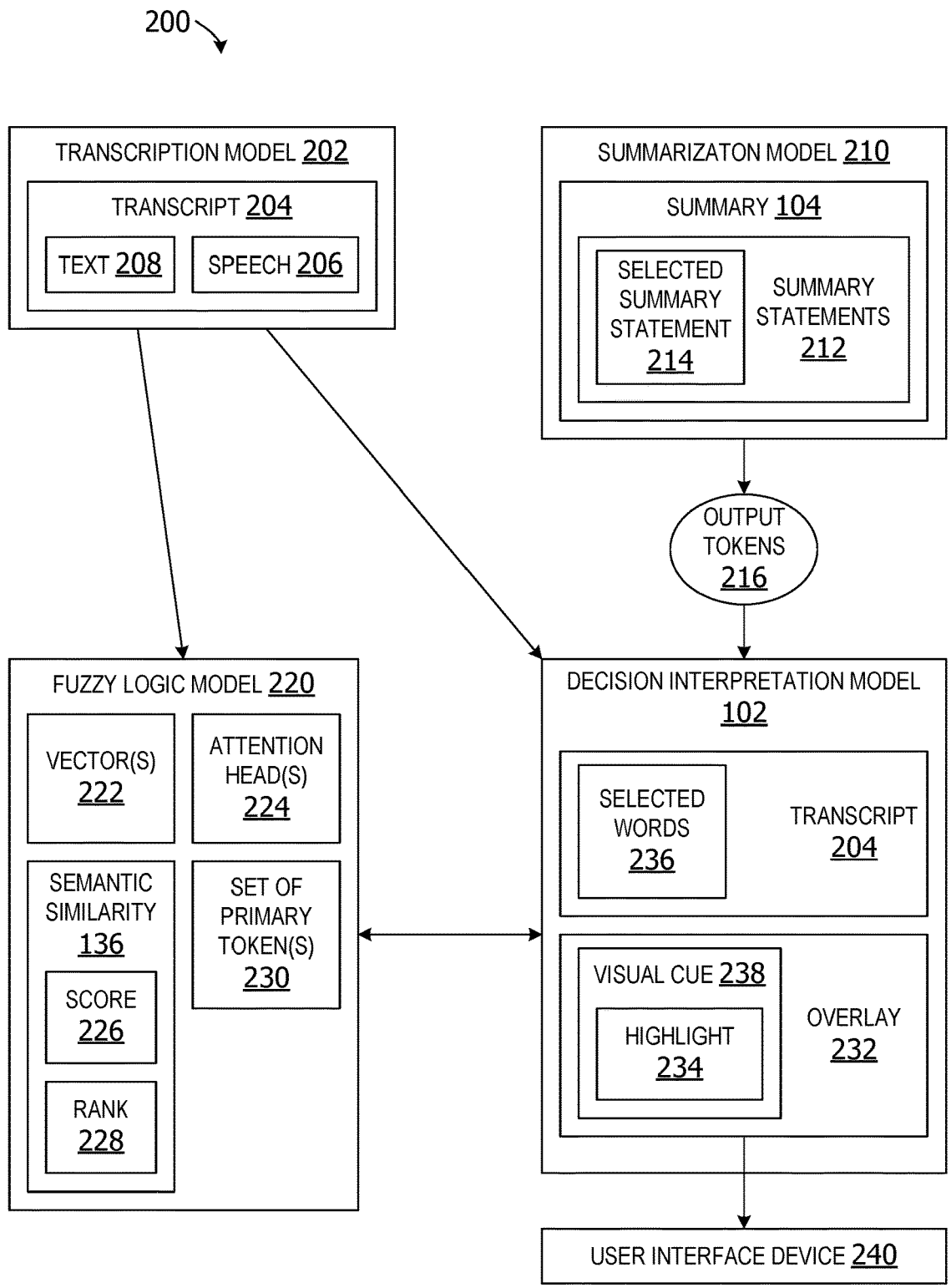
FIG. 2 is an exemplary block diagram illustrating a system for interpreting output of summarization models using fuzzy logic models according to an embodiment.

In other examples, the decision interpretation model 102 obtains a plurality of attention value(s) 114 defining connections between a plurality of input tokens 116 for a plurality of attention heads 118 associated with the source text 106 and a plurality of output tokens 120 associated with a selected portion of the summary 122 of the source text 106 from a summarization model, such as, but not limited to, the summarization model 210 in FIG. 2. Each token in the plurality of input tokens 116 is associated with a word or a portion of a word in the source text 106. Each output token in the plurality of output tokens 120 corresponds to a word or portion of a word in the summary 104 or a selected portion of the summary 122.

The decision interpretation model 102 generates an attention value for each input-output token 124 in a plurality of input-output token pairs 126. Each token pair in the plurality of input-output token pairs 126 includes an input token 123 from the plurality of input tokens 116 paired with an output token 125 from the plurality of output tokens 120 in the selected portion of the summary 122. Thus, a token pair includes one input token and one output token. The attention value for an input-output token pair indicates how closely an output token is related or connected to an input token in the input-output token pair.

An attention-based token ranking engine 108 selects a set of primary tokens 128 from the plurality of input tokens 116 for each attention head in the plurality of attention heads 118 within the summarization model. The attention-based token ranking engine 108 is a software component that is configured to compute normalized attention values for input tokens. The normalized attention values are used to identify a predetermined number of primary tokens from a plurality of tokens associated with each attention head.

In some examples, the attention-based token ranking engine 108 generates a normalized attention value for each token pair. The normalized attention value for each token pair is used to identify the primary tokens for each attention head. A high normalized attention value indicates a greater the connection between the input and output tokens in the token pair. A lower normalized attention value indicates a weaker connection between the input and output tokens in the pair. Thus, the input tokens with the highest normalized value(s) 130 have the strongest connections between the input tokens of the source text and at least one output token of the selected portion of the summary.

The attention-based token ranking engine 108, in other examples, generates aggregated value(s) 132 by summing the attention values for each token pair. The attention-based token ranking engine 108 normalizes the value(s) and then generates a ranking 134 for each token pair based on the normalized value(s) 130.

In other examples, the decision interpretation model 102 includes the fuzzy logic module 110. The fuzzy logic module 110 includes hardware, firmware, and/or software configured to select an attention head from the plurality of attention heads having a selected set of primary tokens which are semantically similar to the summary 104 or a portion of the summary selected by a user. The fuzzy logic module 110, in some examples, is implemented by a natural language processing (NLP) model, such as a transformer model (e.g., using Bidirectional Encoder Representations from Transformers (BERT) techniques or the like). "Fuzzy" here refers to finding words in the output that are semantically close, but not necessarily identical to, the internal attention tokens.

The fuzzy matching module 110 calculates a semantic similarity 136 between the selected set of primary tokens 138 having the highest normalized attention values for each attention head with one or more output tokens associated with the selected portion of the summary 122. In some examples, the semantic similarity is calculated as a set of vector values. In other examples, the semantic similarity is calculated as semantic similarity score(s) 140 indicating a degree of semantic similarity between each primary input token and an output token from the summary 104.

In still other examples, the fuzzy logic module 110 uses the semantic similarity score(s) 140 to rank 142 each input token in accordance with least similar to closest (greatest) semantic similarity with the output token(s). Each primary token in the list of tokens for each attention head corresponds to a word or portion of a word in the source text 106. The fuzzy logic module utilizes a predetermined number of the highest rank or highest scoring input tokens to select a set of words from the source text 106 which can be used to explain the summary or a portion of the summary 122. In this example, the selected set of words 144 can include one or more word(s), phrase(s) and/or sentence(s).

The visualization engine 112 generates a visual cue 146 which highlights or creates an emphasis on the selected set of words 144 within a portion of the source text 106. The visual cue 146 is any type of visual cue, such as, but not limited to, a color, underline, bold type font, box enclosing one or more words, arrow(s), annotation(s), a fade-in of the text, a fade-out of the text, etc. In some examples, the visual cue 146 is output to the user as an overlay 148 generated on top of a portion of the summary 104 displayed to the user via a user interface device or other display device. In still other examples, the visual cue 146 is generated alongside (either right side or left side) of the portion of the summary 104, beneath the portion of the summary 104, above the portion of the summary 104, or otherwise presented in a manner that emphasizes or highlights the portion of the summary.

In some examples, the decision interpretation model generates the visual cue for a single selected portion of the summary. In other examples, the visual cue can include visual cues for multiple different portion of the summary selected by a user. In such cases, the words, phrases and/or sentences highlighted for each different portion of the summary can include a different visual cue. For example, the visual cue for the first portion of the summary can include underlining the portion of the source text in green, a second visual cue for a second portion of the summary can including underling different words in the source text in blue, etc.

In another example, different visual cues may be used to indicate different sets of words ranked as being closest, second closest, etc. For example, the first set of words for a first attention head ranked closest semantically to the portion of the summary may be identified with a box around the selected words. A second set of words for a second attention head ranked second closest semantically to the selected portion of the summary may be underlined rather than placed into a box to indicate that while this text may be relevant, it is likely not as interesting for explaining the selected portion of the summary as the text which is enclosed or boxed. Thus, there may be multiple different types of visual cues utilized in the source text to identify different source text for different portions of the summary or identify different portions of the source text for the same portion of the summary that may be more or less interesting with regard to interpreting the selected portion of the summary.

In one example, an agent provided with an automatic summary of a recorded meeting would like to know which part of the conversation the summary is based on and potentially delve deeper into the conversation in these specific parts. The visual cues indicate portions of the source text which explain part of the summary and enables the user to perform a deeper dive into those specific portions of the transcript as efficiently as possible. The visual cue(s) can be used to highlight or otherwise indicate words, phrases and sentences from the source text which can be used to explain the part of the summary, indicate which portion(s) of the source text were used to create a specific part of the summary, build user trust in the artificial intelligence (AI) summarization model, and hold the summarization model accountable for its decisions. The visual cue(s) can also be used to fine-tune the summarization model, provide feedback to the summarization model, train new summarization models and/or retrain the existing summarization model.

Turning now to FIG. 2, an exemplary block diagram illustrating a system 200 for interpreting output of summarization models using fuzzy logic models according to an embodiment is shown. The system 200 includes a transcription model 202 configured to generate a transcript 204 of communication(s) involving one or more participants speech. The transcription model 202 includes hardware, firmware, and/or software configured to transcribe natural language human speech 206 into a text 208 format. The transcription model 202 can also create a transcript record of text 208 from communications, such as email, instant messaging messages, etc. The transcript 204 is a source text input into a summarization model 210, such as the source text 106 in FIG. 1.

The summarization model 210 is a deep learning model for summarizing a source text in whole or in part. The summarization model 210, in some examples, includes hardware, firmware, and/or software configured to generate the summary 104. The summary 104 is an automated summary including a plurality of summary statements 212 summarizing portions or segments of the transcript 204. Each selected summary statement 214 is associated with a larger portion of the transcript 204. In other words, each summary statement in the summary 104 is a more concise summarization of a portion of the transcript 204 linked to the summary statement via an identifier and/or timestamp. For example, if a paragraph of the transcript 204 includes a dozen sentences having two-hundred or more characters, the summary statement summarizing that paragraph of the transcript may include only one or two sentences having fifty or fewer characters, making the summary more concise than the corresponding portion of the original source text.

Although the user may be able to review the corresponding paragraph of the original source text associated with the selected summary statement 214, the user in this example would be forced to read all of the dozen sentences without any clue or indication as to which of the sentences in the original paragraph are represented in the summary statement and which words in the original text contributed to the content of the summary statement. Therefore, the decision interpretation model 102 obtains the output tokens 216 for the plurality of attention heads of the summarization model 210 used to generate the selected summary statement 214 for use in interpreting the summarization model decisions and output summary 104.

The summarization model 210, in some examples, is a generative machine learning (ML) model, such as a generative summarization model or generative conversation model. The summarization model 210 receives the transcript 204 as input and generates the summary 104 as output.

The decision interpretation model 102, in some examples, includes the attention-based token ranking engine, fuzzy logic module and visualization engine, as shown in FIG. 1 above. However, in other examples, the decision interpretation model 102 does not include the fuzzy logic module. In such examples, the decision interpretation model 102 obtains the set of primary tokens for the most semantically similar attention head from a fuzzy logic model via a network connection rather than including a fuzzy logic module as part of the decision interpretation model 102, as is shown in FIG. 2. In these examples, the fuzzy logic model may be implemented on the same computing system as the decision interpretation model 102 or implemented on a different system or server than the system or server hosting the decision interpretation model 102. In these examples, data is exchanged between the decision interpretation model 102 and the fuzzy logic model 220 via the network.

The network may be implemented by one or more physical network components, such as, but without limitation, routers, switches, network interface cards (NICs), and other network devices. The network may be any type of network for enabling communications with remote computing devices, such as, but not limited to, a local area network (LAN), a subnet, a wide area network (WAN), a wireless (Wi-Fi) network, or any other type of network.

The decision interpretation model 102 utilizes the attention values and output tokens obtained from the summarization model 210 to generate a set of primary tokens for each attention head in the plurality of attention heads used by the summarization model 210 to create the summary 104. The fuzzy logic model 220 generates vector(s) 222 for each input token in each set of primary tokens associated with each attention head in the plurality of attention heads 224. The fuzzy logic model 220 generates the semantic similarity 136 score 226 and/or rank 228 for each set of primary token(s) 230 for each attention head in the plurality of attention head(s) 224. The set of primary token(s) 230 that are closest in distance (greatest semantic similarity) to the selected summary statement based on the vector(s) 222 is selected. In this example, the decision interpretation model 102 generates a visual cue 238 as an overlay 232 on the transcript 204. The visual cue 238 provides a highlight 234 or otherwise indicates the selected words 236 corresponding to the selected set of primary token(s) 230 having the highest semantic similarity score and/or rank 228.

In some examples, the greatest semantic similarity/closest semantic similarity is determined based on a threshold level of semantic similarity. In these examples, the calculated semantic similarity is compared with a threshold level of semantic similarity. In other examples, the semantic similarity scores or rankings for each set of primary tokens are compared with scores or ranking for other sets of primary tokens to identify the set of primary tokens for the attention head having the greatest semantic similarity to the output tokens in the portion of the summary.

The overlay 232 can include the visual cue superimposed directly on top of the word or word(s) in a portion of the original source text, the visual cue presented over (above) the word or word(s), the visual cue presented beneath (below) the word or word(s), as well as the visual cue presented on either side (left or right) of the word or word(s) in the original source text, such as a portion of the transcript 204.

The visual cue 238, in some examples, is generated within a user interface (UI) device 240 display or other output device presenting the transcript 204 or portion of the transcript to the user via the UI. In some examples, the user interface device 240 includes a graphics card for displaying data to the user and receiving data from the user. The user interface device 240 can also include computer-executable instructions (e.g., a driver) for operating the graphics card. Further, the user interface device 240 can include a display (e.g., a touch screen display or natural user interface) and/or computer-executable instructions (e.g., a driver) for operating the display. The user interface device 240 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

Figure 3:
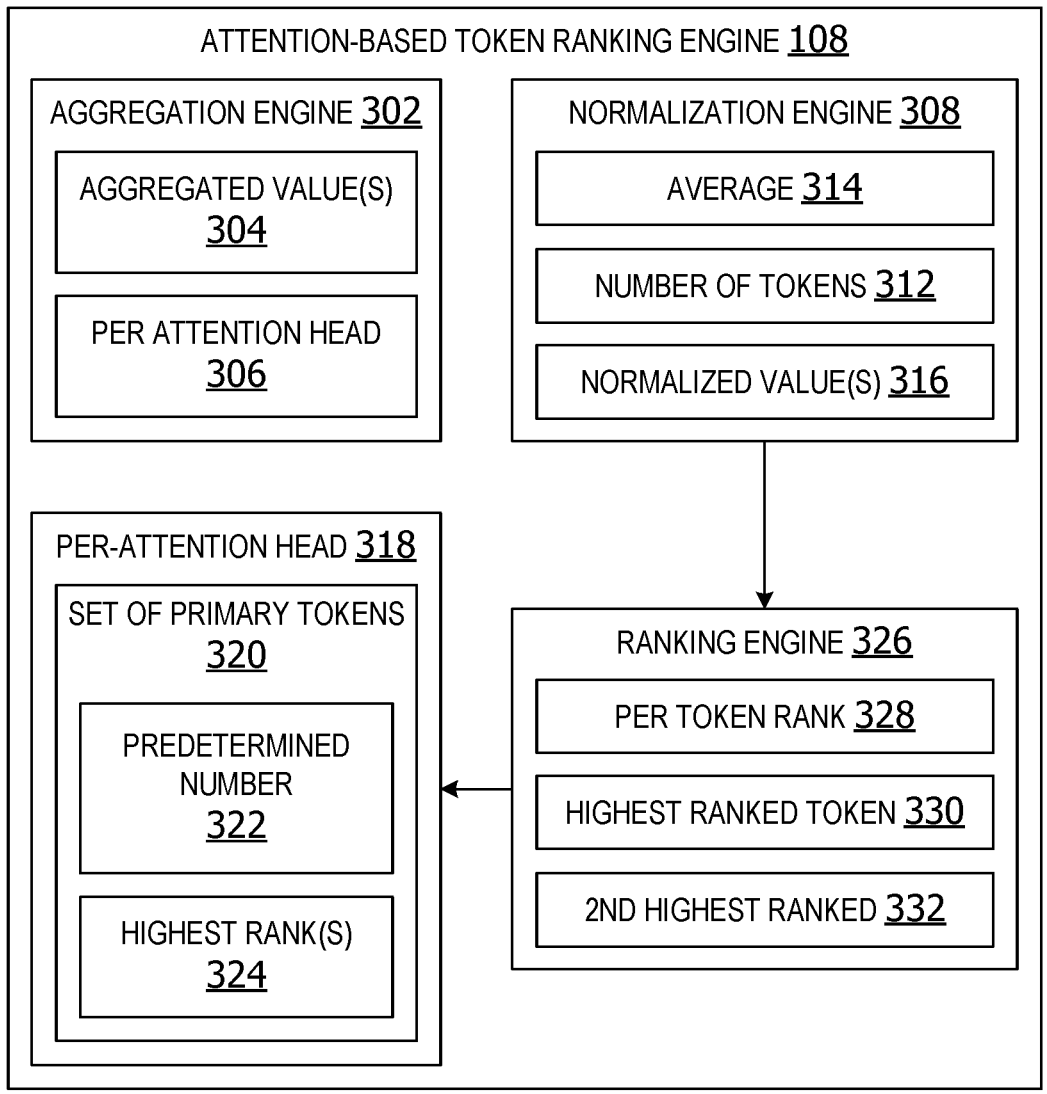
FIG. 3 is an exemplary block diagram illustrating an attention-based token ranking engine for ranking input tokens associated with a summary of a source text according to an embodiment.

FIG. 3 is an exemplary block diagram illustrating an attention-based token ranking engine 108 for ranking input tokens associated with a summary of a source text according to an embodiment. In this example, an aggregation engine 302 is a software and/or firmware component configured to aggregate attention values for a plurality of input tokens associated with a given attention head to generate one or more aggregated value(s) 304. In other words, at least one aggregated attention value is generated per attention head 306. If there are five attention layers utilized by the summarization model, the aggregation engine 302 generates five aggregated attention values for each of the five attention heads corresponding to each attention layer in the summarization model.

A normalization engine 308 is a software or firmware component configured to divide each aggregated attention value for each attention head by the total number of tokens 312 for each attention head to obtain an average 314 value. The average value is a normalized attention value. The normalized value(s) 316 for the plurality of attention heads are used to select a set of primary tokens 320 per attention head 318. Each selected set of primary tokens for each attention head includes a predetermined number 322 of tokens having the highest rank(s) 324 based on the normalized value(s) 316.

In some examples, the attention-based token ranking engine 108 optionally includes a ranking engine 326 which generates a per-token rank 328 indicating a degree of connection or relationship between each input token and an output token. The input tokens having the strongest connection to the output token are selected based on the per-token rank 328. For example, if the predetermined number 322 of tokens to be included in each set of primary tokens 320 is five, the ranking engine 326 ranks all the tokens from the highest ranked 330, the second highest ranked 332, third highest ranked, etc. The attention-based token ranking engine, in this example, selects the five highest ranked tokens. The five highest ranked tokens are tokens ranked from first to fifth highest by the ranking engine 326 indicating these five tokens are the most closely connected to the word or word(s) in the selected portion of the output summary. The attention-based token ranking engine generates a set of primary tokens for each of the attention heads.

In an example, if the input and output each consist of m and n tokens respectively, a single attention head produces m×n distinct numerical values, each belonging to a single pair. In some examples, the attention-based token ranking engine includes an algorithm that aims to rank input tokens from the input transcript and select the most salient ones based on those values.

Thus, given an input source (transcript) text passage of m tokens, an output summary (selected portion) of n tokens, and the m×n values produced by an attention head, the attention-based token ranking engine 108 creates the list or set of primary tokens for each attention head. For each token in the input, the aggregation engine 302 sums all attention values related to the input token and to at least one output token in the summary to receive m distinct aggregated sums.

The normalization engine 308 divides each aggregated sum by the number of output tokens, n, to receive a normalized value per input token. The attention-based token ranking engine 108 selects the predetermined number "k" tokens from the input that correspond to the "k" highest normalized values. The predetermined number "k" is a user-configurable parameter which the user can change or adjust. In other words, the set of primary tokens can include five input tokens, ten input tokens, a hundred input tokens or any other user-configurable number of tokens selected for each attention head.

Figure 4:
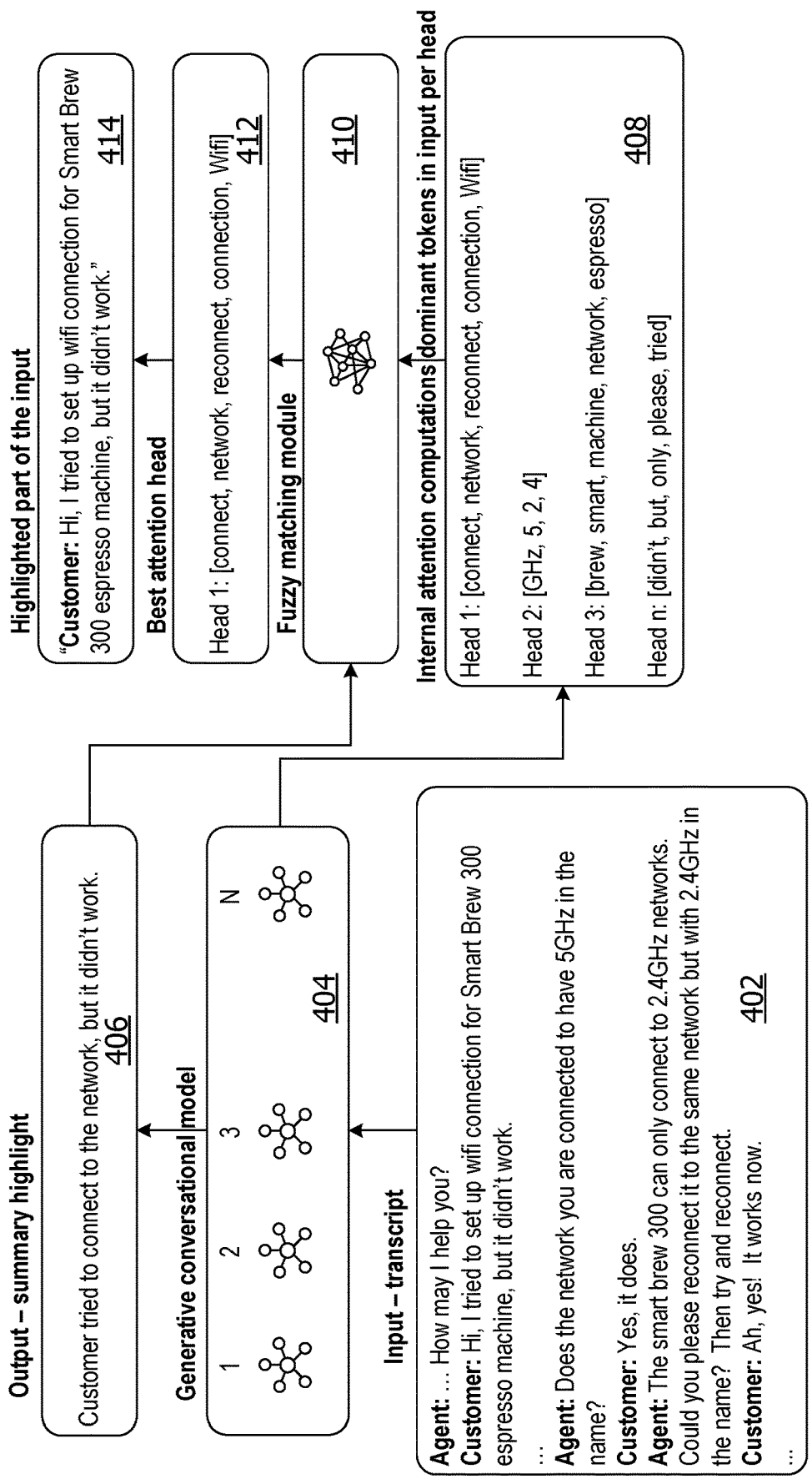
FIG. 4 is a diagram illustrating attention-based decision interpretation of summarization model output according to an embodiment.

Referring now to FIG. 4, a diagram illustrating attention-based decision interpretation of summarization model output according to an embodiment is depicted. In this example, source text at 402 is input into a summarization model at 404. The source text 402 is source input of the system which is to be summarized, such as a meeting transcript. Only a portion of the meeting transcript is shown at 402. In other examples, a complete transcript may be used. The examples are not limited to a transcript of the size or contents shown at 402. The summarization model 404 is a state-of-the-art model that internally makes use of attention computations and outputs a summary highlight at 406. A single highlight or summary statement in the summary of 406 corresponds to a segment or portion of the transcript. A segment of the transcript can be any number of sentences from the transcript, such as a portion of correspondence between an agent and customers or other participants. In one example, the segment of the transcript can include a dozen or more sentences from the transcript. The summarization model 404, in this example, contains attention heads numbered one, two, three and "N". The attention heads do not inherently highlight the most important words. They indicate connections or relations between input and output tokens. For each token in the output, the attention heads provide attention values that correspond to some relation with all of the input tokens.

The decision interpretation model at 406 is a computational module using attention values to create a list of primary (dominant) words (tokens) for each attention head. The list of primary tokens are used to elicit important words for each head using attention values for input and output token pairs used to generate the summary at 406.

The decision interpretation model, in some examples, creates a linkage between the summary highlight and the highlighted portion of the transcript using identifiers. The identifier is associated with each attention head and a given section of the transcript. Thus, a token is associated with a specific instance of a word in a given section of the source text and not associated with every instance of the word throughout every section of the text.

The decision interpretation model performs aggregations and normalizations over all the connections between input and output tokens to find the tokens with the highest attention values indicating the tokens are more distinct or interesting to look at with regard to interpreting the summarization model outputs.

In some examples, each attention head provides a numerical value connecting each pair of input token and output token for each attention head. For example, if the first word in the transcript is "how" and the first word in the output summary is "customer," there is a value computed between the word "customer" and the word "how." The decision interpretation model uses the numerical values to generate the list of tokens for each attention head, shown at 408. The decision interpretation model identifies the words that are distinctively different in behavior pattern and ranks the input words based on the normalized attention values to determine if the word is of significance for interpreting or explaining a particular portion of the summary. The decision interpretation model ranks words or tokens from the transcript using the aggregated and normalized attention values. In this example, the word "connect" gets a higher score than the word "WiFi."

The decision interpretation model chooses a predetermined number of top tokens. In this example, the decision interpretation model selects the top five choices for each attention head. Thus, the decision interpretation model selects a predefined number of words/tokens using the aggregated and normalized attention values for each input token-output token pair.

In some examples, the top tokens selected by the decision interpretation model are not necessarily the tokens with the highest value across all tokens. Instead, the decision interpretation model uses the values for the input and output pairs of tokens. In these examples, the decision interpretation model performs aggregation across all token pairs and normalizes the values for all pairs to find the distinct primary words/tokens. The output is a list of top "k" number of tokens for each attention head. Thus, the algorithm is averaging on both axis of the input tokens and the output tokens to find the primary words that are giving maximal values after aggregation and normalization to produce an "N" number of lists of tokens/words for the "N" number of attention heads.

The decision interpretation model inputs the "N" number of lists of primary tokens/words into a fuzzy matching module at 410. The fuzzy matching module in this example is a pre-trained masked language model based on transformer architecture such as a BERT based model for example. The fuzzy matching module computes the semantic similarity of each list of tokens with the output summary or portion of the output summary. In other words, the fuzzy matching model produces a vector for each sentence or for each list of primary tokens. The fuzzy matching model is applied to compute pairwise similarity between the first attention head primary token list vector and the selected summary portion, the second attention head list vector and the summary portion, the third attention head primary token list and the summary portion, etc. This produces an N+1 number of vectors including a vector value for the portion of the summary and each list or set of primary tokens.

The decision interpretation model ranks the attention heads based on the semantic similarity of each list with respect to the summary statements or summary parts, which produces the single best list and/or filters all other lists at 412.

The visual cue is generated within the transcript at 414. The visual cue does not alter the summary. Instead, it marks the relevant part of the input transcript. The system is identifying the most relevant section of the transcript used to create the summary portion or that explains the summary portion content. The visual cue is a user-configurable visual or graphic that serves to emphasize or otherwise highlight one or more words in the source text which is most relevant to interpreting or explaining the contents of a portion of the summary.

Figure 5:
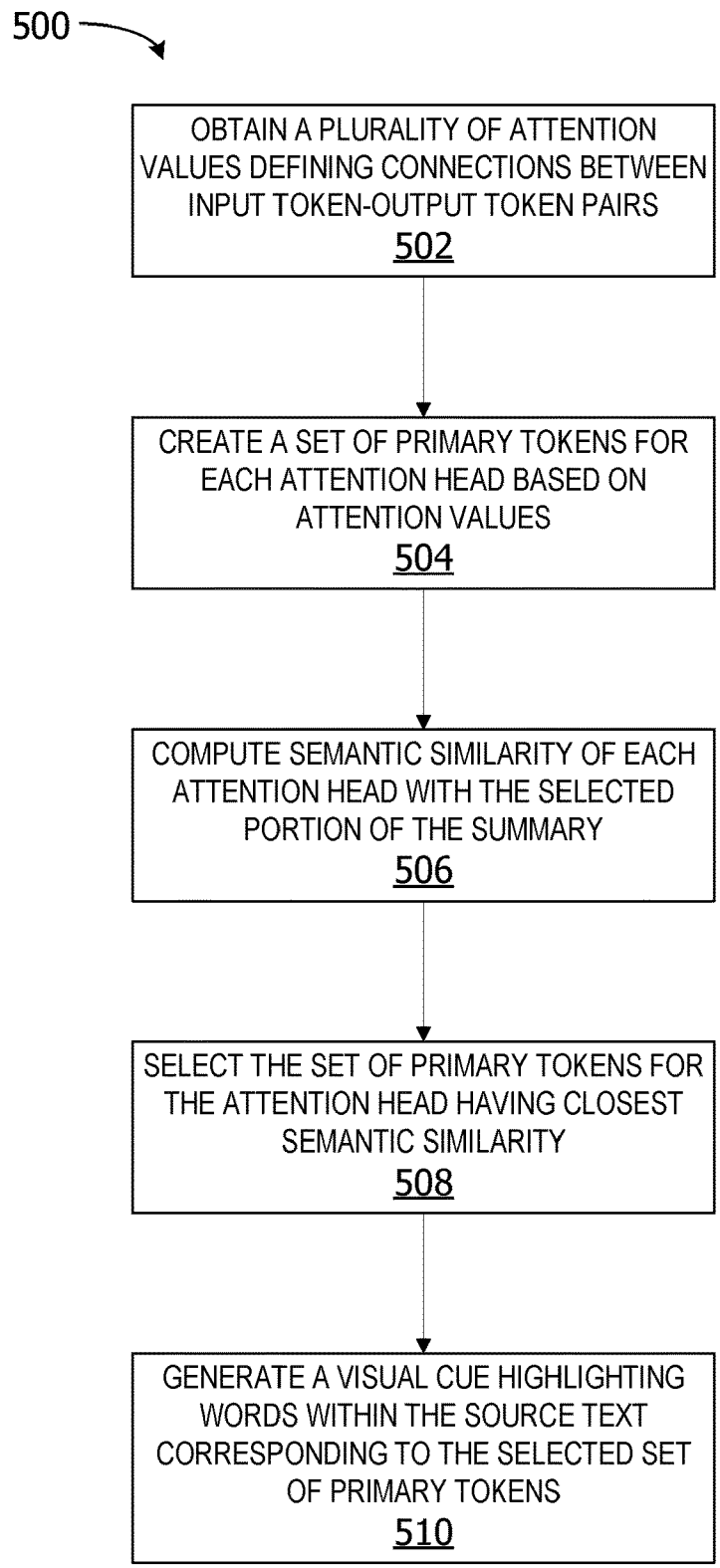
FIG. 5 is a flowchart illustrating a computerized method for attention-based interpretation of summarization model output according to an embodiment.

FIG. 5 is a flowchart illustrating a computerized method 500 for attention-based interpretation of summarization model output according to an embodiment. In some examples, the method 500 is performed on a system such as system 100 of FIG. 1 and/or the system 200 of FIG. 2 as described herein. At 502, the decision interpretation model obtains a plurality of attention values defining connections between input token-output token pairs. The input token-output token pairs are token pairs, such as the token pairs 126 in FIG. 1. The decision interpretation model creates a set of primary tokens for each attention head based on the attention values at 504. In addition, or alternatively, the decision interpretation model may generate a normalized attention value for each token and utilize the normalized values to select the primary tokens. The decision interpretation model computes semantic similarity of the set of primary tokens for each attention head with the selected portion of the summary at 506. In some examples, the decision interpretation model generates vectors representing each set (list) of primary tokens for each attention head and the selected portion of the summary. The vector values are then used to calculate the semantic similarity between each attention head and the selected portion of the summary. The decision interpretation model at 508 selects the set of primary tokens for the attention head having the greatest semantic similarity. In other words, the system identifies the list of primary tokens which are semantically closest to the word or word(s) in the portion of the summary. At 510 the decision interpretation model generates a visual cue highlighting word(s) within the source text corresponding to the selected set of primary tokens.

Figure 6:
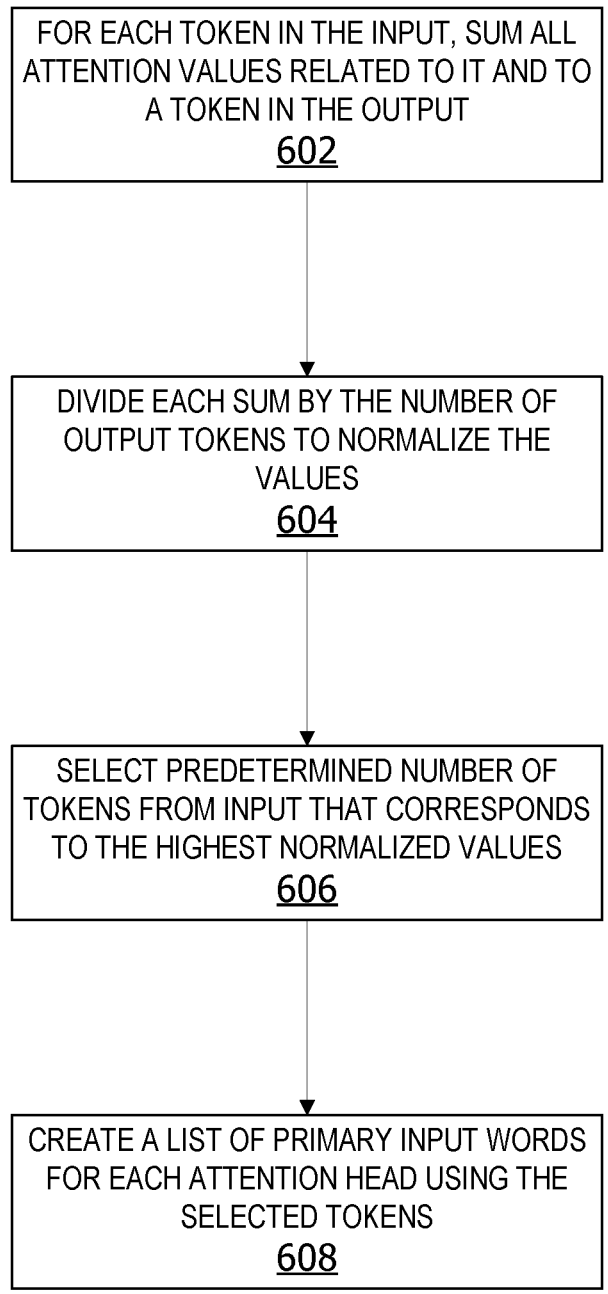
FIG. 6 is a flowchart illustrating a computerized method for creating a list of primary input words associated with a source text using attention values according to an embodiment.

FIG. 6 is a flowchart illustrating a computerized method 600 for creating a list of primary input words associated with a source text using attention values according to an embodiment. In some examples, the method 600 is performed on a system such as system 100 of FIG. 1 and/or the system 200 in FIG. 2 as described herein. At 602, the decision interpretation model sums all attention values related to each input token and an output token. The decision interpretation model divides each sum by the number of output tokens to normalize the attention values at 604. A predetermined number of input tokens are selected that corresponds to the highest normalized values at 606. The predetermined number of input tokens selected is a user-defined value. Alternatively, the predetermined number may be a default number of tokens. A list of primary input words for each attention head using the selected tokens is created at 608. The list of primary words is a set of one or more tokens for a given attention head. Each input token corresponds to a word, words, or portion of a word in a portion of the input source text used to create the automated summary.

Figure 7:
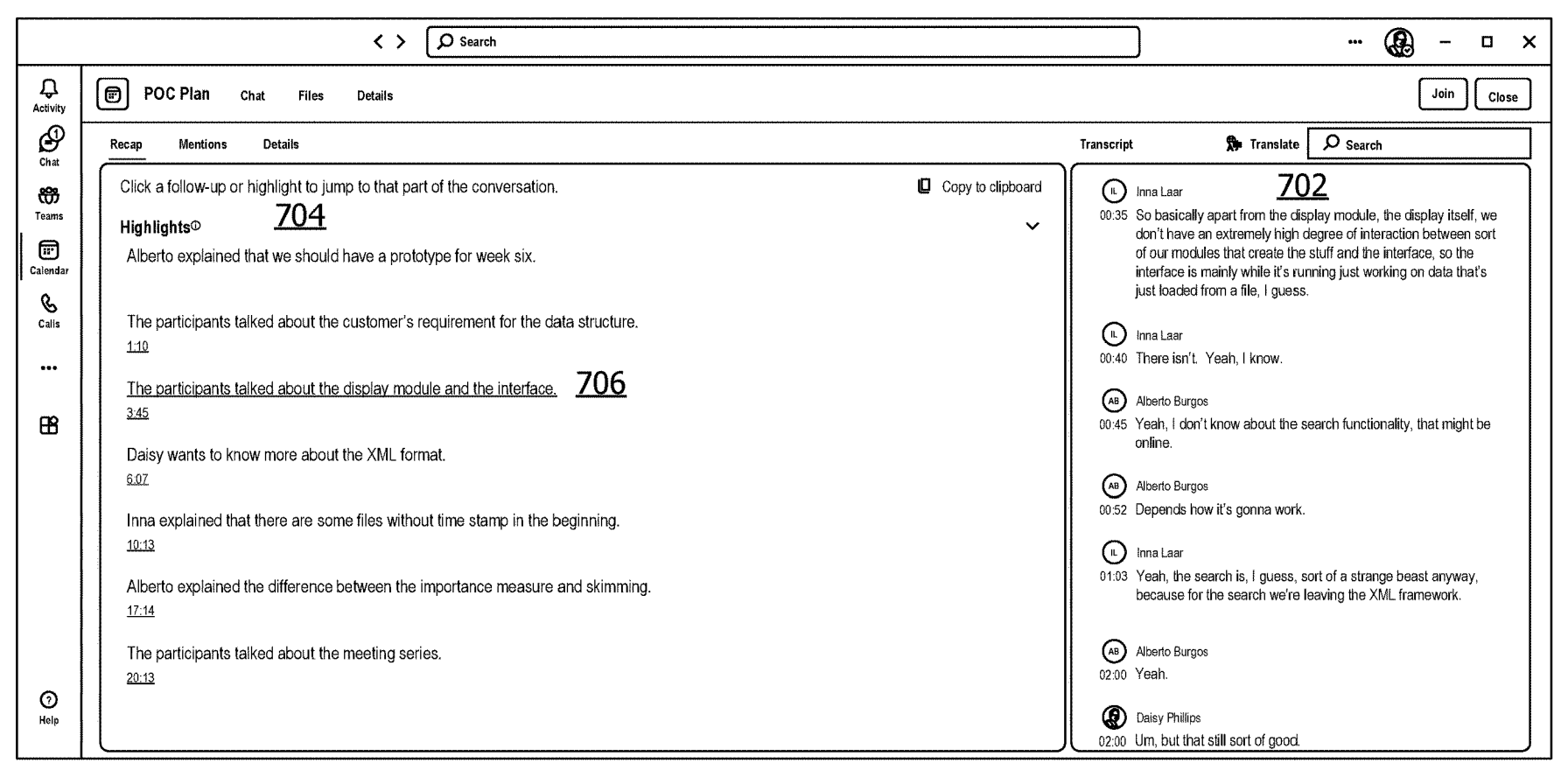

FIG. 7 is an exemplary screenshot illustrating generation of a visual cue identifying primary words in source text 702 corresponding to a summary 704 of the source text 702 or a section of the source text 702. In this example, the user selected a portion 706 of the summary 704. The selected portion 706 is underlined. However, the examples are not limited to underlining the selected portion of the summary. In other examples, the selected portion is indicated by an arrow, bolding, etc. The system generated an overlay visual cue highlighting the phrases "apart from the display module" and "so the interface is mainly while". Although these are not complete sentences, the highlighted phrases represent the highest-ranking tokens in this example.

Exemplary Operating Environment

Figure 8:
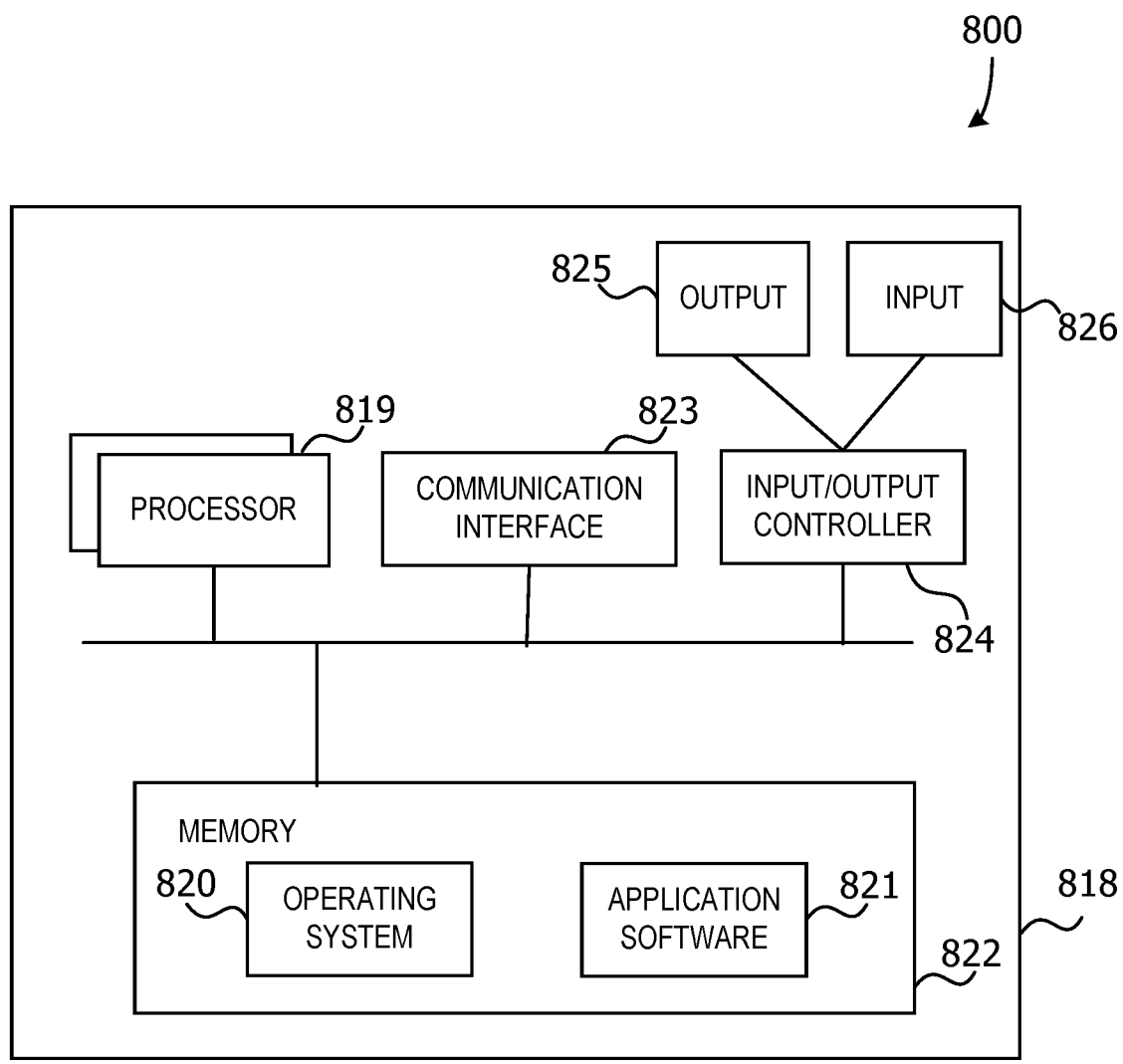
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, training and using a summarization model to provide topic labels for communication transcripts as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for interpreting attention-based decisions of summarization outputs comprises: at least one processor; and at least one memory comprising computer program code, the at least one memory and the computer program code configured to, with the at least one processor, cause the at least one processor to: obtain, by a decision interpretation model implemented on the at least one processor, a plurality of attention values defining connections between input tokens associated with a source text and output tokens associated with a selected portion of a summary of the source text from a summarization model; select, by the decision interpretation model, a set of primary tokens from a plurality of input tokens associated with each attention head in a plurality of attention heads within the summarization model based on the attention values, wherein input tokens having highest attention values indicating strongest connections between the input tokens of the source text and at least one output token of the selected portion of the summary are selected: compute, by a fuzzy matching module of the decision interpretation model, a semantic similarity between the selected set of primary tokens for each attention head with a plurality of output tokens associated with the selected portion of the summary: select the set of primary tokens for an attention head having greatest semantic similarity with the selected portion of the summary; and generate, within a user interface, a visual cue highlighting a plurality of words within a portion of the source text corresponding to the selected set of primary tokens for the attention head having the greatest semantic similarity with the selected portion of the summary.

An example computerized method for interpreting attention-based decisions of summarization outputs comprises: obtaining, by at least one processor of a decision interpretation model, a plurality of attention values defining connections between input tokens associated with a source text and output tokens associated with a selected portion of a summary of the source text from a summarization model: selecting, by the at least one processor, a set of primary tokens from a plurality of input tokens associated with each attention head in a plurality of attention heads within the summarization model having attention values indicating strong connections between the input tokens of the source text and at least one output token of the selected portion of the summary: computing, by the at least one processor, a semantic similarity between the selected set of primary tokens for each attention head with a plurality of output tokens associated with the selected portion of the summary: selecting the set of primary tokens for an attention head having the greatest semantic similarity with the selected portion of the summary; and generating a visual cue highlighting a plurality of words within a portion of the source text displayed via a graphical user interface, the visual cue highlighting the plurality of words corresponding to the selected set of primary tokens for the attention head having the greatest semantic similarity with the selected portion of the summary.

One or more computer storage media having computer-executable instructions for interpreting attention-based decisions of summarization outputs generated by a deep learning model that, upon execution by a processor, cause the processor to at least: obtain, by a decision interpretation model implemented on the at least one processor, a plurality of attention values defining connections between input tokens associated with a source text and output tokens associated with a selected portion of a summary of the source text from a summarization model: select, by the decision interpretation model, a set of primary tokens from a plurality of input tokens associated with each attention head in a plurality of attention heads within the summarization model having attention values indicating strong connections between the input tokens of the source text and at least one output token of the selected portion of the summary: compute, by a fuzzy matching module of the decision interpretation model, a semantic similarity between the selected set of primary tokens for each attention head with a plurality of output tokens associated with the selected portion of the summary: select the set of primary tokens for an attention head having the greatest semantic similarity with the selected portion of the summary; and generate, within a user interface, a visual cue highlighting a plurality of words within a portion of the source text corresponding to the selected set of primary tokens for the attention head having the greatest semantic similarity with the selected portion of the summary.

Consumers of the outputs of deep learning models may sometimes be concerned about using them because they don't know how the DLM came up with its decision. The decision interpretation model provides visual cues within source text for explaining how a DLM summarizes a conversation or other source text. Specifically, the system looks at the attention values of an AI system to determine the most relevant tokens. With that data, the system highlights or otherwise provides a visual cue on the actual source text that includes those tokens that were used to generate the summary of the text. This helps build trust with consumers of the output of the idea.

In some examples, the system uses a fuzzy matching module that receives internal attention token heads (i.e. layers of the model) and the summary output by the generative conversation model to select the head (i.e., attention layer) with the best tokens to highlight in the input.

In an example, an attention head includes the words connection, reconnect, and Wifi which is not in the summary output but are semantically close to the words in the summary. The remaining attention heads would not be selected by the fuzzing matching module because the fuzzy matching score would be lower where the semantics do not match the output.

In some examples, the system provides insight into how deep learning models create a summary of a conversation, by identifying tokens in conversation (or parts of conversation) that are used for creating the summary. The identified tokens are highlighted and displayed to users to provide insight into the working of the DLMs and build trust with the users. The system uses a fuzzy logic model that receives internal attention token heads (e.g., group of words) and a summary output generated by a generative conversation model from the input text. The fuzzy logic model selects a head with the best tokens to highlight in the input text.

In other examples, the system uses a fuzzy matching module for highlighting token(s) in an input conversation/dialogue. The tokens are derived from the input conversation/dialogue in form of heads such that each head includes multiple tokens. The multiple heads and a summary output of the input conversation/dialogue (generated using a generative conversational model) are input into the fuzzy matching module. A best head including tokens that are semantically close to the summary output are identified. The best token(s) in the input conversation/dialogue are highlighted or otherwise identified using a visual cue within the source text displayed to the user via a UI or other display device.

Alternatively, or in addition to the other examples described herein, examples include any combination of the following:

- rank the plurality of input tokens associated with each attention head based on the attention values;
- wherein a highest ranked input token as a strongest connection between the input token and a paired output token;
- wherein the set of primary tokens for each attention head are selected based on the rankings;
- wherein the set of primary tokens includes a predetermined number of words from a plurality of words within the source text;
- aggregate all attention values for a selected input token associated with a portion of the source text;
- divide the aggregated attention value for the selected input token by a number of output tokens to receive a normalized attention value for the selected input token;
- rank the plurality of attention heads based on the semantic similarity of each attention head with the selected portion of the summary;
- wherein the highest ranked attention head is identified as the attention head having the set of primary tokens with greatest semantic similarity to the selected portion of the summary;
- generate a vector for each attention head in the plurality of attention heads from the summarization model and a vector representing the selected portion of the summary;
- identify the attention head having the greatest semantic similarity to the selected portion of the summary by comparing the generated vectors for the plurality of attention heads and the selected portion of the summary.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by at least one processor of a decision interpretation model, a plurality of attention values defining connections between input tokens associated with a source text and output tokens associated with a selected portion of a summary of the source text from a summarization model: exemplary means for selecting, by the at least one processor, a set of primary tokens from a plurality of input tokens associated with each attention head in a plurality of attention heads within the summarization model having attention values indicating strong connections between the input tokens of the source text and at least one output token of the selected portion of the summary: exemplary means for calculating, by the at least one processor, a semantic similarity between the selected set of primary tokens for each attention head with a plurality of output tokens associated with the selected portion of the summary; exemplary means for selecting the set of primary tokens for an attention head having the greatest semantic similarity with the selected portion of the summary; and exemplary means for generating a visual cue highlighting a plurality of words within a portion of the source text displayed via a graphical user interface, the visual cue highlighting the plurality of words corresponding to the selected set of primary tokens for the attention head having the greatest semantic similarity with the selected portion of the summary.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
obtain, by a decision interpretation model implemented on the processor, a plurality of attention values defining connections between input tokens associated with a source text and output tokens associated with a selected portion of a summary of the source text from a summarization model, the summarization model comprising a plurality of attention heads, each attention head in the plurality of attention heads comprising a plurality of input tokens;
create, by the decision interpretation model, a set of primary tokens for each attention head in the plurality of attention heads based on the plurality of attention values, wherein a primary token is an input token selected from the plurality of input tokens for each attention head based on the plurality of attention values;
calculate, by a fuzzy matching module of the decision interpretation model, a semantic similarity between the set of primary tokens for each attention head with a plurality of output tokens associated with the selected portion of the summary;
select, by the decision interpretation model, the set of primary tokens for an attention head in the plurality of attention heads having closest semantic similarity with the selected portion of the summary; and
generate, within a user interface, a visual cue highlighting a plurality of words within a portion of the source text corresponding to the set of primary tokens for the attention head having a highest calculated semantic similarity with the selected portion of the summary.

2. The system of claim 1, wherein the instructions are further operative to:
rank the plurality of input tokens associated with each attention head based on the plurality of attention values, wherein a highest ranked input token has a stronger connection between the input token and a paired output token than a lower ranked input token, wherein the set of primary tokens for each attention head are selected based on the rankings.

3. The system of claim 1, wherein the set of primary tokens includes a predetermined number of words from the plurality of words within the source text.

4. The system of claim 1, wherein the instructions are further operative to:
aggregate attention values for a selected input token associated with the portion of the source text; and
divide the aggregated attention value for the selected input token by a number of output tokens to receive a normalized attention value for the selected input token, wherein each set of primary tokens are created based on normalized attention values for the plurality of input tokens associated with each attention head in the plurality of attention heads.

5. The system of claim 1, wherein the instructions are further operative to:
rank each attention head in the plurality of attention heads based on the calculated semantic similarity associated with each set of primary tokens for each attention head with the selected portion of the summary, wherein a highest ranked attention head is identified as the attention head having the set of primary tokens with greatest semantic similarity to the selected portion of the summary.

6. The system of claim 1, wherein the instructions are further operative to:
generate a vector for each attention head in the plurality of attention heads from the summarization model and a vector representing the selected portion of the summary; and
identify the attention head having greatest semantic similarity to the selected portion of the summary by comparing the generated vectors for the plurality of attention heads and the selected portion of the summary.

7. The system of claim 1, wherein the instructions are further operative to:
overlay the visual cue on a set of words within the portion of the source text corresponding to the set of primary tokens for the attention head having greatest semantic similarity with the selected portion of the summary.

8. A computerized method comprising:
obtaining, by a processor, a plurality of attention values defining connections between input tokens associated with a source text and output tokens associated with a selected portion of a summary of the source text from a summarization model, the summarization model comprising a plurality of attention heads, each attention head in the plurality of attention heads comprising a plurality of input tokens;
creating, by the processor, a set of primary tokens for each attention head in the plurality of attention heads based on the plurality of attention values, wherein a primary token is an input token selected from the plurality of input tokens for each attention head based on the plurality of attention values;
calculating, by the processor, a semantic similarity between the set of primary tokens for each attention head with a plurality of output tokens associated with the selected portion of the summary;
selecting, by the processor, the set of primary tokens for an attention head in the plurality of attention heads having closest semantic similarity with the selected portion of the summary; and
generating, within a user interface, a visual cue highlighting a plurality of words within a portion of the source text corresponding to the set of primary tokens for the attention head having a highest calculated semantic similarity with the selected portion of the summary.

9. The computerized method of claim 8, further comprising:
ranking the plurality of input tokens associated with each attention head based on the plurality of attention values, wherein a higher ranked input token has a stronger connection between the input token and a paired output token than a lower ranked input token, wherein the set of primary tokens for each attention head are selected based on the rankings.

10. The computerized method of claim 8, wherein the set of primary tokens includes a predetermined number of words from the plurality of words within the source text.

11. The computerized method of claim 8, further comprising:
aggregating all attention values for a selected input token associated with the portion of the source text; and
dividing the aggregated attention value for the selected input token by a number of output tokens to receive a normalized attention value for the selected input token.

12. The computerized method of claim 8, further comprising:
    ranking the plurality of attention heads based on the calculated semantic similarity of the set of primary tokens associated with each attention head to the selected portion of the summary, wherein a highest ranked attention head is identified as the attention head having the set of primary tokens with greatest semantic similarity to the selected portion of the summary.

13. The computerize method of claim 8, further comprising:
    generating a vector for each attention head in the plurality of attention heads from the summarization model and a vector representing the selected portion of the summary; and
    identifying the attention head having greatest semantic similarity to the selected portion of the summary by comparing the generated vectors for the plurality of attention heads and the selected portion of the summary.

14. The computerized method of claim 8, further comprising:
    overlaying the visual cue on a set of words within the portion of the source text corresponding to the set of primary tokens for the attention head having greatest semantic similarity with the selected portion of the summary.

15. One or more computer storage devices having computer-executable instructions that, upon execution by a processor, cause the processor to at least:
    obtain, by a decision interpretation model implemented on the processor, a plurality of attention values defining connections between input tokens associated with a source text and output tokens associated with a selected portion of a summary of the source text from a summarization model, the summarization model comprising a plurality of attention heads, each attention head in the plurality of attention heads comprising a plurality of input tokens;
    create, by the decision interpretation model, a set of primary tokens for each attention head in the plurality of attention heads based on the plurality of attention values, wherein a primary token is an input token selected from the plurality of input tokens for each attention head based on the plurality of attention values;
    calculate, by a fuzzy matching module of the decision interpretation model, a semantic similarity between the set of primary tokens for each attention head with a plurality of output tokens associated with the selected portion of the summary;
    select the set of primary tokens for an attention head in the plurality of attention heads having closest semantic similarity with the selected portion of the summary; and
    generate, within a user interface, a visual cue highlighting a plurality of words within a portion of the source text corresponding to the set of primary tokens for the attention head having a highest calculated semantic similarity with the selected portion of the summary.

16. The one or more computer storage devices of claim 15, wherein computer-executable instructions, upon execution by the processor, further cause the processor to at least:
    rank the plurality of input tokens associated with each attention head based on the plurality of attention values, wherein a higher ranked input token has a stronger connection between the input token and a paired output token than a lower ranked input token, wherein the set of primary tokens for each attention head are selected based on the rankings.

17. The one or more computer storage devices of claim 15, wherein the set of primary tokens includes a predetermined number of words from the plurality of words within the source text.

18. The one or more computer storage devices of claim 15, wherein computer-executable instructions, upon execution by the processor, further cause the processor to at least:
    aggregate all attention values for a selected input token associated with the portion of the source text; and
    divide the aggregated attention value for the selected input token by a number of output tokens to receive a normalized attention value for the selected input token.

19. The one or more computer storage devices of claim 15, wherein computer-executable instructions, upon execution by the processor, further cause the processor to at least:
    generate a vector for each attention head in the plurality of attention heads from the summarization model and a vector representing the selected portion of the summary; and
    identify the attention head having greatest semantic similarity to the selected portion of the summary by comparing the generated vectors for the plurality of attention heads and the selected portion of the summary.

20. The one or more computer storage devices of claim 15, wherein computer-executable instructions, upon execution by the processor, further cause the processor to at least:
    overlay the visual cue on a set of words within the portion of the source text corresponding to the set of primary tokens for the attention head having greatest semantic similarity with the selected portion of the summary.

* * * * *